United States Patent [19]

Weir et al.

[11] 3,925,533
[45] Dec. 9, 1975

[54] PROCESS FOR TREATING NICKELIFEROUS LATERITE ORE CONTAINING LIMONITE AND SERPENTINE FRACTIONS

[75] Inventors: Donald Robert Weir, Fort Saskatchewan; David John Ivor Evans, North Edmonton, both of Canada

[73] Assignee: Sherritt Gordon Mines Limited, Ontario, Canada

[22] Filed: Dec. 6, 1973

[21] Appl. No.: 422,214

[30] Foreign Application Priority Data
Oct. 29, 1973  Canada .................. 184513

[52] U.S. Cl. ........................... 423/150; 75/119
[51] Int. Cl.[2] ........................... C01G 53/12
[58] Field of Search ............ 75/1, 82, 103, 119; 423/150

[56] References Cited
UNITED STATES PATENTS

| | | |
|---|---|---|
| 2,400,114 | 5/1946 | Hills .................. 75/103 |
| 2,400,461 | 5/1946 | Hills .................. 75/82 X |
| 2,478,942 | 8/1949 | Queneau et al. .......... 75/82 |
| 3,100,700 | 8/1963 | Hills .................. 75/119 |
| 3,644,114 | 2/1972 | Vosahlova et al. ........ 75/103 X |
| 3,775,090 | 11/1973 | O'Kane et al. .......... 75/1 |

*Primary Examiner*—Oscar R. Vertiz
*Assistant Examiner*—Brian E. Hearn
*Attorney, Agent, or Firm*—Frank I. Piper; Arne I. Fors; James T. Wilbur

[57] ABSTRACT

A method of treating nickeliferous laterite ore containing limonite and serpentine fractions to improve its responsiveness to the known reduction roast-ammonium carbonate leach process. According to the process the limonite and serpentine fractions are roasted separately under different conditions and following roasting are leached separately. After leaching the two fractions are combined and are releached together.

6 Claims, 1 Drawing Figure

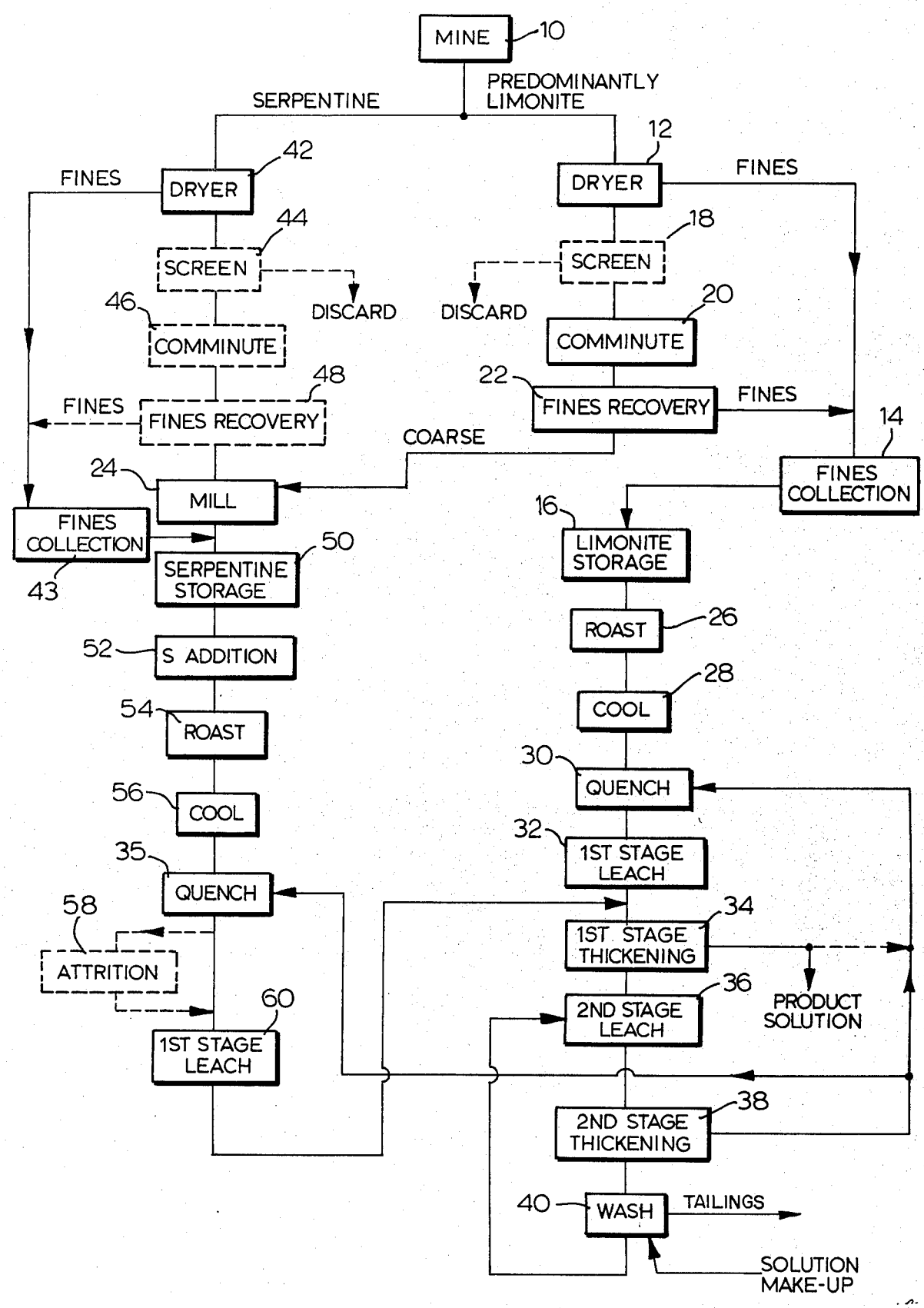

PROCESS FOR TREATING NICKELIFEROUS LATERITE ORE CONTAINING LIMONITE AND SERPENTINE FRACTIONS

This invention relates to the recovery of nickel from nickel-bearing laterite and garnierite ores. More particularly, the invention relates to an improvement in the known reduction roast ammonium carbonate leach process which permits the treatment of nickeliferous laterite and garnierite ores whereby an improved yield of nickel may be obtained therefrom.

Nickeliferous laterites which are produced from weathering of nickel- and iron-containing rocks consists of soft, sometimes clay-like decomposed material. The laterite usually are found in layered deposits, the upper layer being composed of minerals termed "limonite" and a lower layer termed "serpentine". Usually, the composition of the limonite layer is in the range of 0.4 and 1.8% by weight nickel, 4.0 and 48% by weight iron and 0.2 and 1.0% magnesium. The serpentine layer usually contains between 0.8 and 2.7% by weight nickel, between 6 and 17% iron and between about 15 117 and 22% magnesium. The limonite and serpentine layers may be separated by one or more intermediate layers having compositions which lie somewhere between those of the former layers.

Various procedures are known for recovery of nickel and cobalt values from such ore. One well known method commonly referred to as the "reduction roast-ammonium carbonate leach process" involves roasting the ore under reducing conditions to reduce selectively nickel and cobalt oxides in the material to a crude metallic state, quenching and then leaching the reduced material with ammoniacal ammonium carbonate solution. Leaching is carried out in two or more stages under oxidizing conditions to extract the nickel and cobalt values. The nickel and cobalt values are recovered from the leach liquor by boiling the solution to drive off ammonia and carbon dioxide in order to cause dissolved nickel and cobalt to precipitate in the form of basic carbonate compounds. The precipitate is then heated to convert it into a mixed nickel-cobalt oxide product.

According to conventional practice the serpentine and limonite fractions of laterite and garnierite deposits are not treated separately in the reduction roasting operation but are treated as a blend. This is because such deposits are mined by open pit methods and it is more economical to mine non-selectively such that the limonite and serpentine fractions are removed simultaneously from the ground. Furthermore, where the two fractions are roasted separately, the extraction of nickel from the fractions in the subsequent leaching step will be low where the conditions prevailing during the separate roasting of the two fractions are the same. The reason is that roasting conditions which produce optimum results when applied to one fraction will produce inferior results when applied to the other fraction. Since it is impractical to alter roaster conditions to those best suited to whichever of the two fractions is being fed to the roaster at any given time, it is the practice to mine the limonite and serpentine layers in a way such as to produce a blend of the two fractions having a predetermined analysis. A method by which the fractions may be treated to provide such a blend is described in Canadian Pat. No. 926,381.

For the reasons mentioned above, in practice the feed material for the reduction roast ammonium carbonate leach process is a blend of limonite and serpentine layers. Applicants have found however, that where the blend contains a substantial amount of serpentine, the proportion of nickel contained in the blend which can be extracted by the process is significantly less than where the blend contains a small proportion of serpentine. The reason is believed to be, at least in part, because serpentine contains proportionately more magnesium than does limonite and maagnesium interferes with the leaching operation. During the roasting operation at least some of the magnesium values convert to an active oxide form which upon contact with the ammoniacal ammonium carbonate leach solution converts to complex magnesium carbonate, possibly in the form of $x$ Mg $[OH]_2.y$ MgCO$_3$ [basic magnesium carbonate] or Mg CO$_3$ [NH$_4$]$_2$CO$_3$.4H$_2$O. Apparently these complexes coat the outer surfaces and the interstices of the ore particles and act as a diffusion barrier. The leach solution and oxygen cannot therefore penetrate into the particles and nickel values cannot diffuse out of them. As a result, the particles are incompletely leached and a substantial proportion of the nickel values remains out of contact with the leach solution.

It has been found that the problems caused by the complex magnesium carbonates can be substantially overcome and consequently the extraction of nickel greatly improved from ores containing in addition to limonite substantial quantities of serpentine where the fractions are treated separately during the initial stages of the reduction roast ammonium carbonate leach process and not together throughout the entire process as is the conventional practice. Specifically, where the known process is modified by separately roasting the limonite and serpentine fractions under different conditions and, following roasting, by leaching the two fractions separately, thereafter by combining the two fractions and by releaching them together, significantly improved results are achieved. In the treatment of typical laterite deposits, improvement in extractions in the order of 5 - 10% and often higher over that obtainable where the conventional procedure is followed can be obtained.

The process of the present invention may be broadly described as involving the steps of dividing nickeliferous laterite ore into a first fraction consisting predominantly of limonite ore and a second fraction consisting predominantly of serpentine ore; mixing with said second fraction a sulphurbearing additive in an amount sufficient to provide a sulphur content in the mixture of between about 0.2 and 5% by weight; separately roasting in the presence of reducing gases said first fraction and said mixture at temperatures within the ranges of 1150° to 1350°F. and 1200° and 1600°F. respectively in order to convert contained nickel values to a crude metallic state; separately passing to first leach stages said roasted first fraction and said roasted mixture and separately leaching same with aqueous ammoniacal ammonium carbonate solutions in the presence of free oxygen to extract nickel values and dissolve them in solution; combining solution and undissolved residue from the first leach stage containing said roasted first fraction with solution and undissolved residue from the first leach stage containing said roasted mixture and passing said combined solution and undissolved residue to a liquid-solids separation operation; removing solution from said liquid-solids separation operation and recovering at least a portion thereof as product liquor while recycling any remaining unrecovered solution to the first leach stage containing said roasted first fraction; passing undissolved residue removed from said liquid-solids separation operation to a second leach stage and leaching same with an aqueous ammoniacal ammonium carbonate solution in the presence of free oxygen to extract nickel values and dissolve them in solution; removing solution from said second leach stage and recycling a portion thereof to each said first leach stages.

The process of the invention is described in detail below with reference to the accompanying drawing which illustrates a flow scheme of a process incorporating the improvement of the present invention. The process incorporates a method of separating a large proportion of the serpentine fraction from a starting blend of serpentine and limonite by classifying the blend by particle size into two fractions. The fraction containing particles larger than a given size is composed largely of serpentine while the other fraction containing particles smaller than the given size is composed largely of limonite. This size classifying method is described in detail in Canadian Pat. No. 926,381.

With reference to the drawing, ore in situ at 10 is mined semi-selectively to avoid as much as possible mixing of the limonite layer with the serpentine layer. The limoninte deposit, which contains some serpentine, is fed to dryer 12. Hot gases are passed to the dryer to decrease the moisture content of the particles to below about 5%. The velocity of the gases is adjusted such that a large proportion of particles smaller than about 65 mesh standard Tyler screen are picked up and exit from the dryer in the gas stream. These particles have an iron content in excess of 40% by weight and are composed largely of limonite. The particles are collected in fines collection apparatus 14 such as a cyclone separator and electrostatic precipitator. The fines pass to storage 16.

The particles in the coarse fraction which remain in the dryer 12 are larger than about 65 mesh and are composed of serpentine and agglomerated limonite fines. Should these particles contain large rocks such as +2 mesh the particles may be passed to screen 18 where the rocks can be separated. The rocks generally do not contain nickel and cobalt values in sufficient quantities to justify treatment for extraction of such values and they can be discarded. If on the contrary the nickel and cobalt values in such rocks justify their treatment, the rocks can be passed to comminution step 46 described below.

The coarse material from dryer 12 optionally passed through screen 18 passes to impact comminuting apparatus 20 such as a hammer mill in which fines adhering to coarse particles are separated therefrom and agglomerated fines are broken down. The fines are removed in fines recovery apparatus 22 such as an air classifier and are added to the storage 16. The coarse fraction passes from apparatus 22 to a milling apparatus 24 to produce a feedstock having a low iron content.

The foregoing method for separation of the fine fraction from the coarse fraction is described in detail in the Canadian Patent referred to above.

The limonite particles in storage 16 are fed to roaster 26 where they are heated under controlled conditions in contact with reducing agents, preferably hydrogen or carbon monoxide or mixtures thereof. The ore may be heated in a multiple hearth furnace, a rotary kiln or a fluo-solids roaster. The ore is heated to a temperature in the range of 1150°F and 1350°F. preferably to 1250°F. and is maintained at that temperature to reduce the nickel and cobalt oxides in the ore to a crude metallic stage with minimum accompanying reduction of iron values to metallic iron and ferrous iron (wustite phase). A preferred method for conducting the roasting operation is described in detail in U.S. Pat. No. 3,768,993.

Reduced ore is discharged from roaster 26 is cooled at 28 preferably to about 300°F. then is passed to quench step 30 where it is quenched in ammoniacal ammonium carbonate solution. The quenched slurry is then passed to first stage leach 32 where it is contacted with oxygen-bearing gas to extract the nickel values from the particles and dissolve them in solution. Leaching is carried out according to known procedures such as are described in Canadian Pat. No. 900,179. Following leaching the slurry is passed to first stage liquid-solids separation step or thickener 34. Some or all of the overflow from thickener 34 is treated for recovery of nickel and cobalt values by known procedures. Nickel may for example be recovered by the method described in Canadian Pat. No. 811,079. Preferably at least a portion of the thickener overflow is recycled to quenching step 30. It is preferred to do so in order to build up the nickel and cobalt content of the solution to a level at which these metals can be economically recovered therefrom.

The underflow slurry from thickener 34 is passed to a second leach stage 36 and the leached slurry is passed to second stage thickener 38. Overflow from thickener 38 is recycled partly to quenching step 30 and partly to quenching step 35 described below.

The underflow slurry from thickener 38 is washed with ammonium carbonate make-up solution in washing operation 40 and the wash solution is recycled to the second stage leaching operation 36 and the undissolved residue is discarded as process tailings.

The serpentine deposit from the mining operation 10 is passed to dryer 42 where its moisture content is decreased to below about 5%. The velocity of gases passed to the dryer is adjusted in the same as the gases passing to dryer 12 and the dust particles exiting from dryer 42 are collected at 43 and are passed to serpentine storage 50.

Optionally, where the coarse particles discharged from the dryer contains rocks of larger than 2 mesh, the particles may be passed to screen 44 where the rocks are separated and discarded if they contain uneconomically recoverable amounts of nickel and cobalt. The material passing through screen 44 may then be passed to impact comminuting apparatus 46 in which fines adhering to coarse particles are broken down. The fines are removed at 48 by an air classifier or other suitable apparatus and are collected at 43.

The coarse particles from dryer 42, optionally subjected to steps 44, 46 and 48 are subjected to milling at step 24 to decrease their state of subdivision to substantially 98% – 65 mesh. Ground material from step 24 together with the dust particles from collection apparatus 43 are passed to storage 50.

A sulphur bearing additive is combined at 52 with the ore fed from storage 50 to roaster 54. The additive is any sulphur-containing compound which will provide available sulphur or sulphur oxide to react with the serpentine particles and activate the roasting. Preferably, sufficient additive is combined with the ore to provide a mixture having a total sulphur content of between about 0.2 and 5% by weight. In general, better nickel extractions are achieved in the subsequent leaching step where the mixture contains at least 0.2% sulphur than where the mixture contains less sulphur. Where the ore mixture contains increasing amounts of additive above 5% total sulphur, the nickel extraction from the mixture tends to level off.

Suitable additives include pyrrhotite, pyrite, sulphur-containing fuels, sulphuric acid, hydrogen sulphide, elemental sulphur and sulphur dioxide. The additive should not of course contain material which will interfere with the subsequent leaching operation or which will contaminate the final nickel product. Pyrite is particularly suitable additive for purposes of the present invention since it is easy to store, has a high sulphur content per pound and is usually relatively cheap.

Instead of combining the sulphur bearing additive to the serpentine fraction immediately before roasting it may optionally be combined with the fraction immediately before milling step 24 or immediately before comminution step 46. In such event, these latter steps 24, 46, as well as serving to decrease the state of subdivision of the mixture, serve to mix intimately the ore particles and the additive. As long as the additive is in contact with the fraction during roasting, it will accomplish the desired result.

The conditions prevailing within roaster 54 are the same as those within roaster 26 with the important exception that the temperature prevailing within roaster 54 is in the range of 1200° and 1600°F., preferably about 1450°F.

The roasted ore is cooled, quenched then leached at 56, 35 and 60 respectively, these steps being conducted in the same manner as steps 28, 30 and 32 respectively.

Optionally following the quenching step, the slurry is subjected to attrition at 58. Attrition it is believed, serves to rub or to scuff off the complex magnesium carbonate coating from the serpentine ore particles and to expose the surface of the reduced ore beneath the coating. The leach solution may penetrate these surfaces and substantially more nickel is extracted from the ore than is the case where the ore is not subjected to attrition. Attrition also it is believed, exposes fresh basic magnesium carbonate to the leach solution. Some of the fresh carbonate dissolves in the solution and later recrystallizes as discrete particles of magnesium ammonium carbonate free of nickel. In such form the magnesium does not interfere with the leaching of the nickel-containing ore particles.

Where the slurry is subjected to attrition, as described above, it is preferred that its temperature during attrition be below about 115°F. At such a temperature a substantial portion of the magnesium values in the slurry will be in the form of a solid complex magnesium carbonate coating and attrition will remove this coating. If, however, the temperature of the slurry is above about 115°F., some of the magnesium values will be in solution and will not be affected by attrition. These dissolved magnesium values will be detrimental to the leaching operation since during leaching they will coat the nickel/cobalt containing particles and will prevent the penetration of these particles by the leach solution.

The leach slurry from step 60 is combined with the slurry flowing from first leach stage 32 to first stage thickener 34. The slurry in thickener 34 contains therefore, leached limonite particles and leached serpentine particles.

According to the process just described, the limonite and serpentine fractions are roasted separately and leached separately during the first or initial leaching stage. The two fractions are combined after the first leach stage and are thereafter treated together. By roasting the fractions separately under different conditions and by leaching the roasted fractions separately during the initial stage a high extraction of nickel from the overall feed is achieved. The extraction is better than can be achieved where the two fractions are treated together as a blend as is the conventional practice and in cases where the major proportion of the ore treated is serpentine, the improvement in extraction is particularly marked.

A comparison of the nickel extraction from an ore treated by the known process described above and by the process of the invention is provided in the following example.

EXAMPLE

Two samples of limonitic and serpentinic ores were used as the starting material of the example. Both samples were composed of particles of smaller than 65 mesh standard Tyler screen in size. The analysis of the serpentine fraction in each sample was 2.0% Ni, 16% Fe and 17% Mg and the analysis of the limonite fraction in each was 1.4% Ni, 45% Fe and 0.9% Mg. One sample(A) contained about 70% limonite, balance serpentine and its overall analysis was 1.58% Ni and 36.3% Fe. The other sample (B) contained about equal quantities of limonite and serpentine and its overall analysis was 1.70% Ni and 30.5% Fe.

Each sample was divided into first and second portions. The first portion of each sample was treated by the known method of roasting the particles at 1300°F. in a reducing atmosphere, quenching then leaching in two stages the roasted particles. The washed residues were analyzed in order to determine the % nickel extraction.

The second portion of each sample was treated by the process of the present invention. The limonite fraction was seperated from each portion and roasted at 1250°F. Approximately 1% by weight pyrite was mixed with the serpentine fraction then the mixture was roasted at 1450°F. in a reducing atmosphere. The roasted limonite and serpentine particles of the second portions were leached in two stages in the same way as were the roasted particles making up the first portions except that the two fractions of the second portions were treated separately during the first stage of leaching and were treated together during the second stage of leaching.

The washed residue from the second portions were analysed in order to determine the % nickel extractions. The results of the analyses are as follows;

| | Ore treated | Ni Extraction (%) |
|---|---|---|
| Sample A | First portion (treated throughout as a blend) | 82.4 |
| | Second portion (limonite and serpentine fractions treated separately) | 88.5 |
| Sample B | First portion (treated throughout as a blend) | 78.2 |
| | Second portion (limonite and serpentine fractions treated separately) | 87.6 |

The extractions of nickel from both samples A and B are significantly better where the samples are treated by the subject process than where they are treated as a blend by the known process. The improvement in extraction becomes more pronounced as the quantity of serpentine in the starting material increases, as the above results show.

What we claim as new and desire to protect by Letters Patent of the United States is:

1. A process for extracting nickel from nickeliferous laterite ore composed of limonitic and serpentinic ore particles which comprises: dividing said particles into a first fraction consisting predominantly of limonite ore and a second fraction consisting predominantly of serpentine ore; mixing with said second fraction a sulphur-bearing additive in an amount sufficient to provide a sulphur content in the mixture of between about 0.2 and about 5% by weight; separately roasting in the presence of reducing gases said first fraction and said additive containing second fraction at temperatures within the ranges of 1150°F. to 1350°F. and 1200°F. to 1600°F. respectively in order to convert contained nickel values to a crude metallic state; separately passing to first leach stages said roasted first fraction and said roasted additive containing second fraction and separately leaching each said fraction with aqueous ammoniacal ammonium carbonate solutions in the presence of free oxygen to extract nickel values and dissolve them in solution; combining solution and undissolved residue from the first leach stage containing said roasted first fraction with solution and undissolved residue from the first leach stage containing said roasted additive containing second fraction and passing said combined solution and undissolved residue to a liquidsolids separation operation; removing solution from said liquidsolids separation operation and recovering at least a portion thereof as product liquor while recycling any remaining unrecovered solution to the first leach stage for said roasted first fraction; passing undissolved residue removed from said liguid-solids separation operation to a second leach stage and leaching same with an aqueous ammoniacal ammonium carbonate solution in the presence of free oxygen to extract nickel values and dissolve them in solution; removing solution from said second leach stage and recycling a sufficient portion thereof to said first leach stage for said roasted additive containing second fraction to provide make-up solution therefor and recycling any remaining said solution to said first leach stage for said roasted first fraction.

2. The process as claimed in claim 1 wherein said first fraction is roasted at a temperature of 1250°F. and said mixture is roasted at a temperature of 1450°F.

3. The process as claimed in claim 1, wherein after mixing said additive with said second fraction and prior to roasting said mixture, said mixture is milled to decrease its state of subdivision to substantially 98% minus 65 mesh standard Tyler screen.

4. The process as claimed in claim 1, wherein at least a portion of solution removed from said liquid-solids separation operation is recycled to the first leach stage containing said roasted first fraction.

5. The process as claimed in claim 1, wherein said sulphur-bearing additive is chosen from the group comprising pyrrhotite, pyrite, sulphur-containing fuel, sulphuric acid, hydrogen sulphide, elemental sulphur and sulphur dioxide.

6. The process as claimed in claim 1, wherein said sulphur bearing additive is pyrite.

* * * * *